United States Patent [19]
Brun

[11] Patent Number: 5,273,152
[45] Date of Patent: Dec. 28, 1993

[54] APPARATUS FOR POSITIONING ARTICLES

[75] Inventor: Charles J. Brun, Xenia, Ohio

[73] Assignee: Electra Form, Inc., Vandalia, Ohio

[21] Appl. No.: 870,464

[22] Filed: Apr. 17, 1992

[51] Int. Cl.$^5$ ............................................. B65G 25/00
[52] U.S. Cl. ............................... 198/468.3; 294/87.1
[58] Field of Search ................. 198/434, 458, 468.3; 294/87.1

[56] References Cited

U.S. PATENT DOCUMENTS

| | | | |
|---|---|---|---|
| 3,272,360 | 9/1966 | Schoot | 198/458 |
| 3,501,024 | 3/1970 | Schroder | 294/87.1 |
| 3,753,589 | 8/1973 | Hahn | 294/87.1 |
| 4,061,528 | 12/1977 | Lingl | 198/468.3 |
| 4,199,050 | 4/1980 | Moller | 198/468.3 |
| 4,832,180 | 5/1989 | Ferrero | 198/468.3 |

FOREIGN PATENT DOCUMENTS 2610066 10/1976 Fed. Rep. of Germany ... 198/468.3
111315 8/1980 Japan ........................... 198/468.3

Primary Examiner—Joseph E. Valenza

[57] ABSTRACT

An apparatus for positioning articles, especially plastic articles including an upstream workstation for articles spaced from each other at a first center spacing, a downstream workstation for the articles spaced from each other at a second center spacing which is different than the first center spacing, and a device for altering the center spacing of the articles in two directions from the first center spacing of the upstream workstation to the second center spacing of the downstream workstation, which device includes a plate having a plurality of grooves, and a plurality of support members mounted slidably on the plate, said support members being guided in the grooves of the plate and intersecting at an angle with the grooves of the plate.

3 Claims, 5 Drawing Sheets

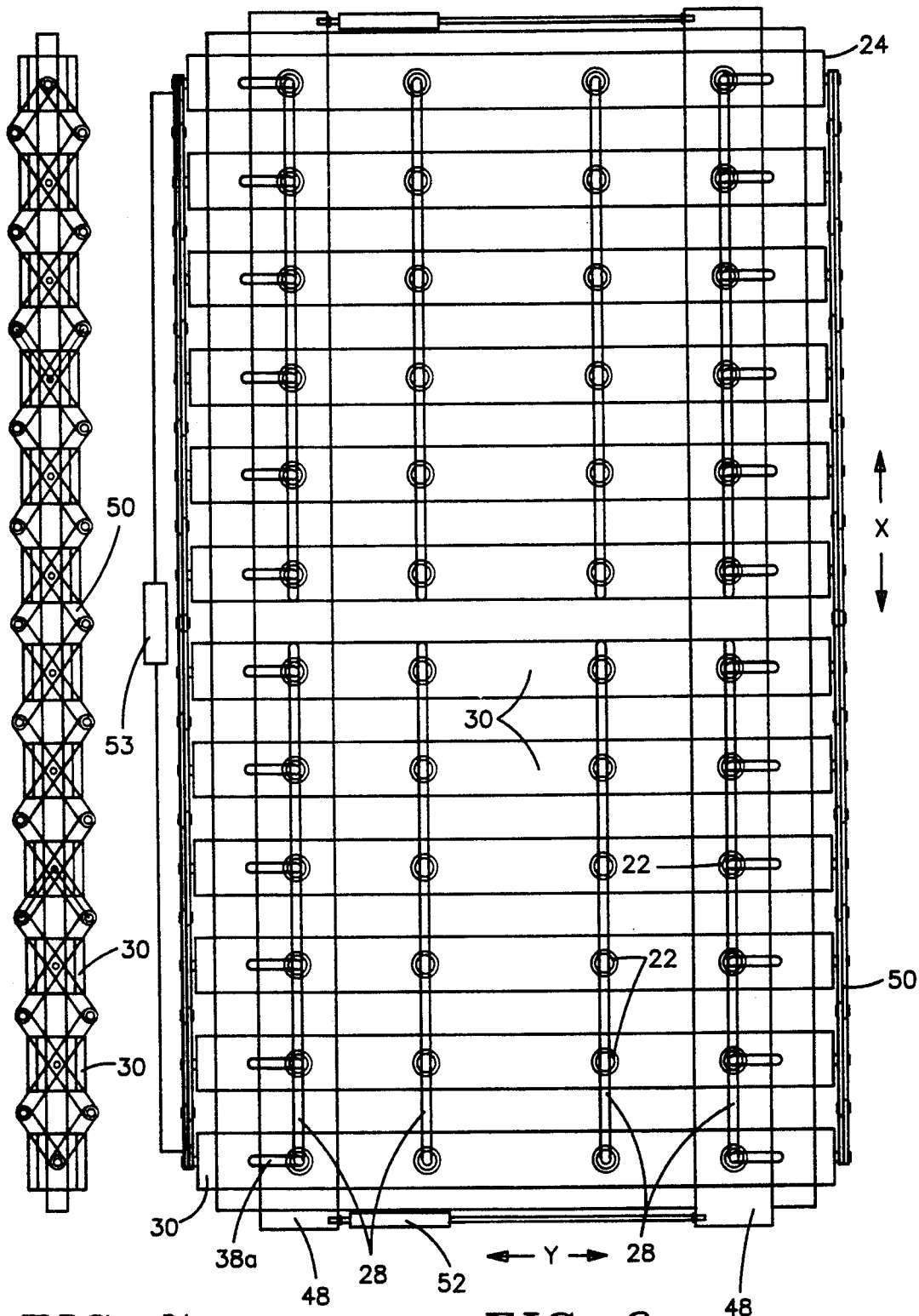

APPARATUS FOR POSITIONING ARTICLES

BACKGROUND OF THE INVENTION

Field of the Invention

The present invention relates to an apparatus for positioning articles having a center spacing, and especially for positioning pressure molded plastic articles that incorporates a variety of interconnected workstations, and, more particularly, to an apparatus for altering the center spacing of articles between various connected workstations.

Description Of The Related Art

During conventional production of plastic articles such as blow molded plastic bottles, it is known to perform various treatments at serially located workstations to obtain the final product. Such processes are disclosed, for example, in U.S. Pat. Nos. 4,197,073 4,313,905, 4,140,464, and 4,234,302.

Different operations to be performed at different workstations typically require different spacing of the articles or parisons to be treated. Thus, it is necessary to position the articles at all workstations to be treated at the largest center spacing required at any one workstation in the machine. For example, two typical functions representative of these known procedures are to injection mold the starting material to form parisons which are subsequently blow molded to form a plastic bottle. In the injection molding stage, a close center spacing is desirable because it is difficult to maintain a desired temperature of the molten plastic over long flow paths. Also, a smaller center spacing at this stage can minimize the size of the platen used in such processes.

At subsequent workstations, however, such as the aforesaid blow molding station, parisons are expanded to form bottles. A larger center spacing is required at these workstations to provide room for the circumferential expansion of the parisons.

Accordingly, it is desirable to optimize molding conditions for the articles by changing the center spacing of the articles from workstation to workstation.

A partial solution to this problem is disclosed, for example, in the aforementioned U.S. Pat. No. 4,197,073 to Rees et al. In this known machine, diverging tracks are used to expand the center spacing of the parisons in one direction. Thus, in the other direction, the parisons must be spaced at the widest spacing required by any workstation.

Another partial solution is disclosed in U.S. Pat. No. 4,323,341 to Valyi. As shown in Valyi '341, a row of parisons is spread in one direction to accommodate the larger required center spacing of a blow molding machine. While this solution helps to improve the efficiency of the operation of the machine, center spacing in one direction is still fixed.

It is desirable, therefore, to provide an apparatus whereby the center spacing of parisons or other articles can be altered in two directions, whereby greater efficiency for each workstation can be achieved, along with an increase in the output of the overall machine.

It is, therefore, the primary object of the present invention to provide an apparatus whereby the center spacing of articles or parisons to be treated can be altered in two directions.

It is a further object of the present invention to provide such an apparatus which can be operated to alter the center spacing in one step without interruption of the operation of the machine.

Further objects and advantages of the present invention will appear hereinbelow.

SUMMARY OF THE INVENTION

The aforesaid objects, and others, are obtained by an apparatus comprising, according to the invention, an upstream workstation for treating a plurality of articles, preferably plastic articles, spaced from each other at a first center spacing, a downstream workstation for said articles spaced from each other at a second center spacing which is preferably larger than the first center spacing, and means for altering the center spacing of the articles in two directions from the first center spacing of the upstream workstation to the second center spacing of the downstream workstation, said means for altering the center spacing comprising a plate means having a plurality of grooves, and a plurality of support members mounted slidably on the plate means, said support members being guided in the grooves of the plate means and intersecting at an angle with the grooves of the plate means. The support means are preferably provided with longitudinal tracks therein.

According to a preferred embodiment of the invention, the apparatus further comprises a plurality of grippers suitable for holding the articles equal in number to a predetermined number of articles to be processed per cycle, the grippers being slidably disposed on the support members at the points of intersection with the grooves of the plate means and the tracks of the support members, whereby displacement of the support members relative to the plate means results in two directional spreading of the grippers from the first center spacing to the second center spacing.

According to a still further preferred embodiment of the invention, the angle of intersection between the grooves of the plate means and the tracks of the support members is predetermined to provide two directional spreading of the articles responsive to motion of the support members only.

In an alternate embodiment of the invention, a plurality of additional support members are mounted slidably on the plate means, at least some of the grooves of the plate means being located on the additional support members, said additional support members being essentially perpendicular to the tracks of the support members, whereby the support members and the additional support members are operative to alter the center spacing of the articles independently in two directions.

Further features and advantages of the present invention will appear hereinbelow.

BRIEF DESCRIPTION OF THE DRAWINGS

A detailed description of the invention follows, with reference to the accompanying drawings, wherein:

FIG. 6 is a top view of still another preferred embodiment of the apparatus according to the invention;

FIG. 7 is a side elevational view of the preferred embodiment of FIG. 6; and

DESCRIPTION OF THE PREFERRED EMBODIMENTS

Figure 1:
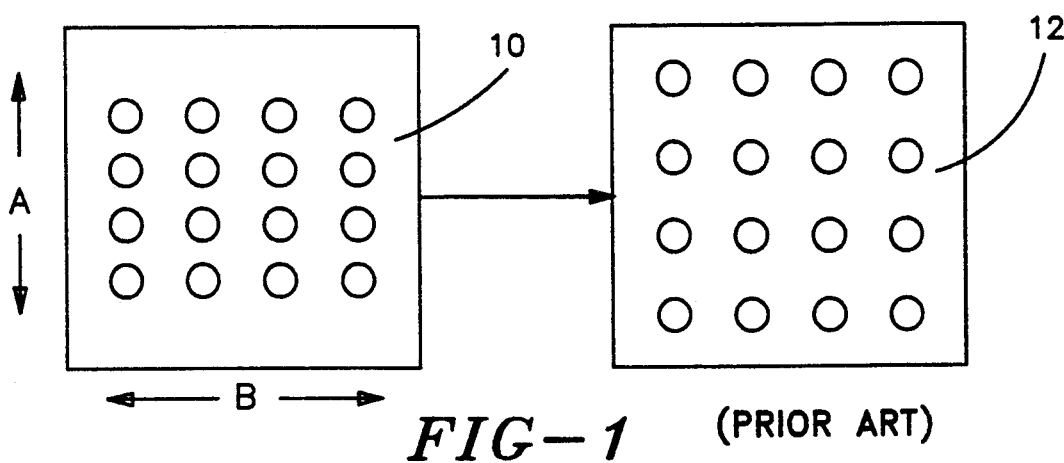
FIG. 1 is a block diagram demonstrating the spreading of articles in one direction as per the prior art.
Figure 2:
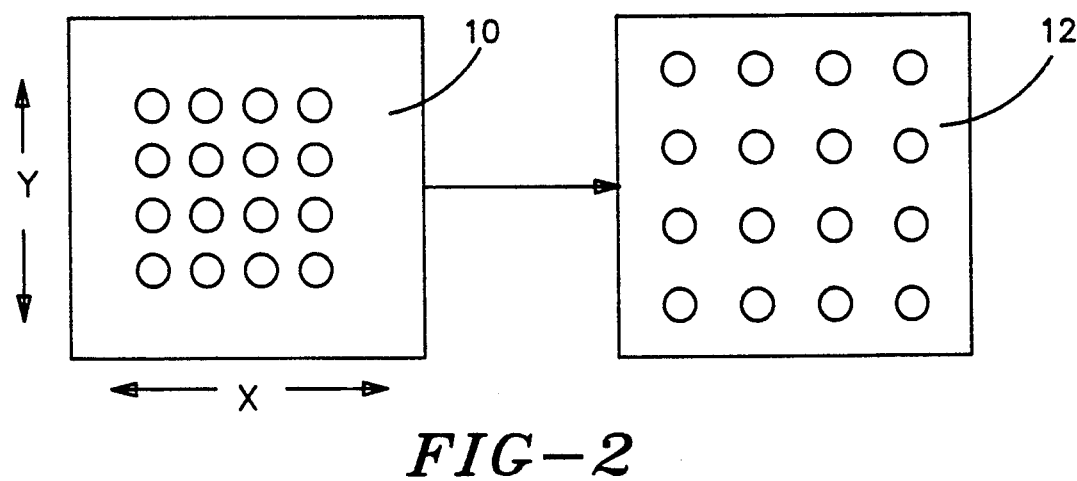
FIG. 2 is a block diagram demonstrating the spreading of articles in two directions according to the invention.

With reference now to the drawings, a detailed description of the preferred embodiments of the invention will be given. With reference to FIGS. 1 and 2, the operation of the prior art and the present invention are schematically depicted. Conventionally, spacing of the articles can be accomplished in one direction, as shown by the arrow (A) in FIG. 1. In the non-altered direction as shown by the arrow (B), spacing must be sufficient at upstream workstation (10) to accommodate the largest possible spacing required by any workstation, as at downstream workstation (12). The apparatus according to the present invention, however, is used to alter the center spacing between an upstream workstation (10) and the downstream workstation (12) in two directions. As shown in FIG. 2, the invention may advantageously be used to increase the two directional center spacing of work pieces from a close spacing as shown in the upstream workstation (10) to a wider center spacing as shown in the downstream workstation (12). As schematically depicted in FIG. 2, spacing is increased in two directions (X, Y). Such a function is useful in any situation where it is desirable to reposition or alter the spacing between work pieces during the operation of a machine, and has particular use when the upstream workstation (10) is an injection molding station and the downstream workstation (12) is a blow molding workstation. In such a situation, the injection molding is preferably carried out at a close spacing, for example to help avoid problems caused by the flow of molten plastic over greater distances. A narrower spacing at the injection molding workstation is also desirable for the purpose of reducing the space occupied by this portion of the machine, and reducing the size of the platen used in this procedure. At a blow molding workstation, however, the articles are to be circumferentially expanded and must therefore be spaced from each other at a distance sufficient to accommodate the expansion of the articles. Thus, the center spacing of the blow molding stations must generally be significantly larger than the center spacing at the injection molding workstation in two directions.

Figure 3:
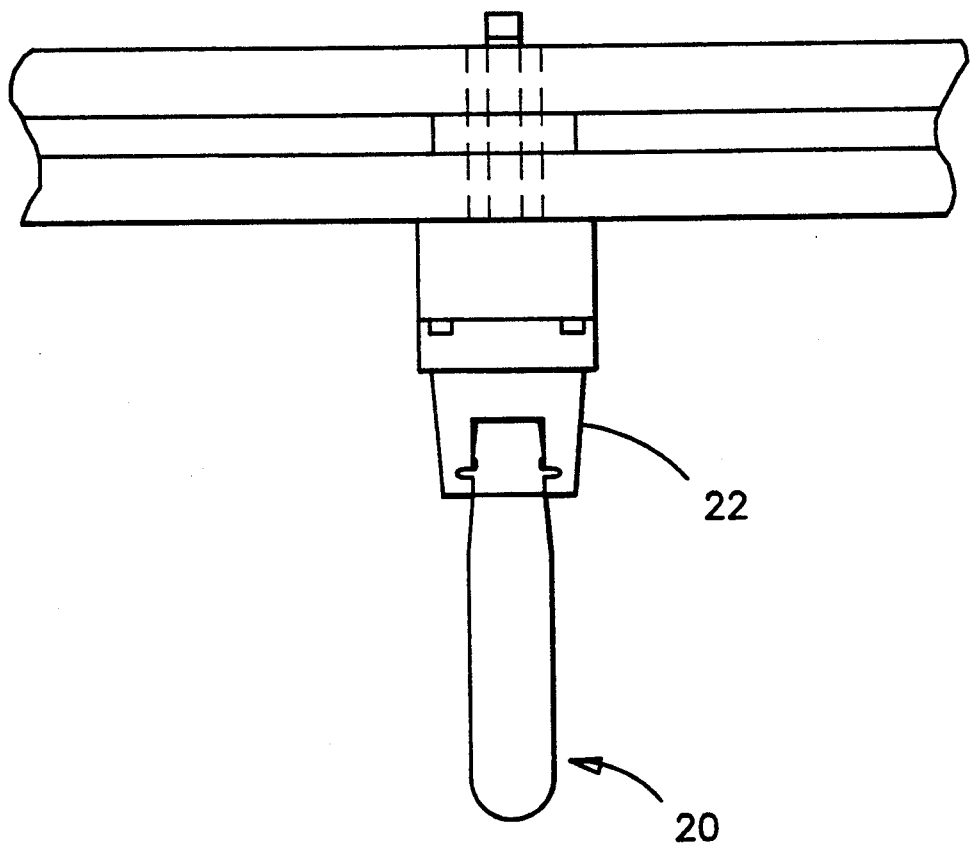
FIG. 3 is a side elevational view a preferred embodiment of the invention.

With reference now to FIG. 3, the articles or work pieces to which the invention is directed are typically parisons (20) which are formed at an injection molding workstation in a conventional manner as an intermediate step in manufacturing plastic bottles. The parisons (20) are subsequently expanded at a blow molding workstation to obtain the final product, also in a conventional manner. The transport of parisons (20) may be conducted by any desired means, as through grippers (22) which are generally depicted in FIG. 3, but for which any type of gripping means which may be known in the art may be substituted.

According to the present invention, the grippers (22) or desired holding means are laterally repositioned in two directions as shown in FIG. 2 to place the parisons (20) in their intended locations for the blow molding operation.

Figure 4:
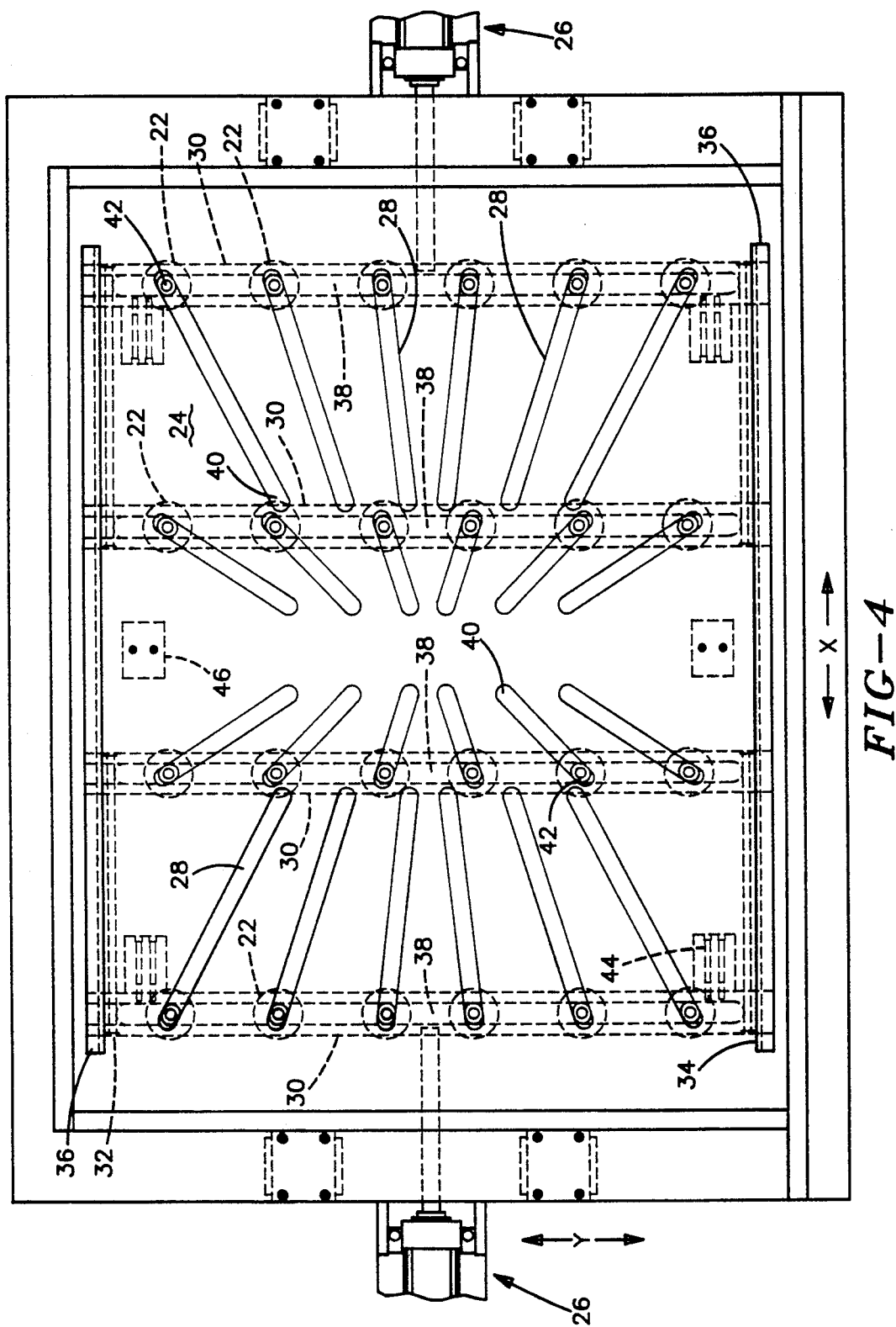
FIG. 4 is a top view of the apparatus according to a preferred embodiment of the invention, with additional features being shown in dashed lines.

With reference to FIG. 4, a preferred embodiment of the apparatus of the present invention will be described. The grippers (22) are preferably suspended from a plate means preferably comprising a base plate (24) which may be mounted on any conventional mounting means, not shown, to facilitate movement to and from the desired workstations in the machine. The base plate (24) may be in the form of a generally flat plate and is provided with grooves (28) extending therethrough.

A plurality of support members (30) or pushers (shown in phantom) are slidably mounted on the base plate (24). The slidable mounting of the support members (30) may preferably be achieved through disposing each end (32), (34) of the support members (30) in brackets (36) mounted to the base plate (24) and positioned to provide the desired sliding motion of the support members (30) along the base plate. Each support member (30) has at least one track (38) extending therethrough and intersecting the grooves (28) of the base plate (24). The grippers (22) (shown in phantom) are mounted on the support members at the points of intersection of the grooves (28) of the base plate (24) and the tracks (38) of the support members (30), with the grippers (22) sliding along grooves (28) upon movement of the support members (30). Therefore, lateral spreading of the support members (30) will result in angular displacement of the grippers (22) and parison held thereon along the grooves (28) of the base plate (24) resulting in altering the center spacing of the articles held by grippers (22) in both the (X) and (Y) directions as shown in FIG. 4, with the (X) direction being essentially perpendicular to the support members and the (Y) direction being essentially parallel to the support members. In such a fashion, the grippers (22) can be conveyed from a first center spacing, depicted by the inner ends (40) of the grooves (28) (the closed position) to a larger second center spacing (the open position shown in FIG. 4) defined by the outer ends (42) of the grooves (28). It should be noted that a center spacing of any desired distance between the inner ends (40) and outer ends (42) can also be achieved.

The lateral motion of the support members (30) which imparts the desired spreading of the grippers (22) can be provided through any motive means, e.g., fluid cylinders (26), as shown in FIG. 4.

It should also be noted that while this disclosure is made in terms of increasing the center spacing in two directions, the teachings contained herein could likewise be adapted to decrease the center spacing should such a function be desirable.

The support members (30) preferably have a length sufficient to accommodate the maximum spacing of the articles, and are selected in number corresponding to the number of rows of articles to be treated during each cycle of the machine. Each track (38) extending through a support member (30) may preferably extend the entire length of the support member (30).

The grooves (28) of the base plate (24) can be disposed at any angle to the tracks (38) of the support members (30) in order to achieve the desired motion of the grippers (22), generally from 10 to 90°, inclusive. Thus, the orientation or divergence of the grooves (28) as located in the base plate (24) can be selected to increase or decrease the resulting article spacing in both the (X) and (Y) directions (as depicted by the arrows (X, Y) in FIG. 4).

It should be noted, as shown in FIG. 4, that the means for altering the center spacing is operative to achieve an angular displacement from a first center spacing to a second center spacing.

While the displacement of parisons is described in terms of (X) and (Y) directions, these directions are in fact the linear components of the motion of each parison from its position at the first center spacing to the second center spacing.

The resulting actual motion of each parison will be an angular displacement.

The proper spacing between the support members (30) when they are moved back and forth from closed to open positions can be maintained through the use of bumpers (44) coacting with cylinders (46), both shown in phantom. As shown in FIG. 4, the inner limits of motion of the support members is reached when the inner most two support members contact the cylinders (46) and the bumpers (44) of the outer most two support members contact the inner most support members.

Figure 5:
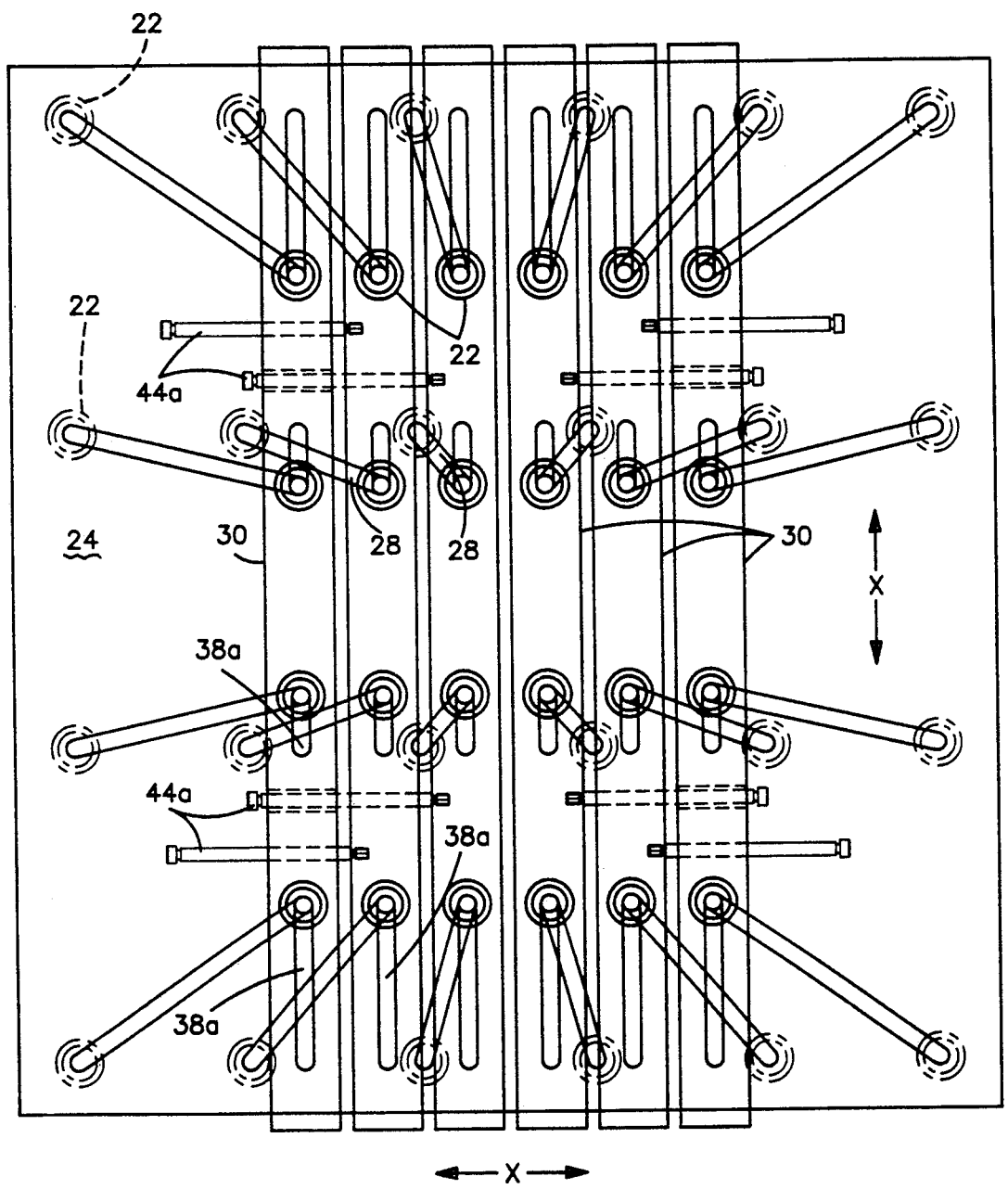
FIG. 5 is a top view of an alternate embodiment of an apparatus according to the invention, also with additional features of the invention being shown in dashed lines.

With reference now to FIG. 5, an alternate embodiment will be described.

According to FIG. 5, each support member (30) has a plurality of tracks (38a) extending therethrough. Each track (38a) of the plurality of tracks extends only so far as is necessary to accommodate the desired motion of the gripper (22) mounted on the support members. FIG. 5 shows the grippers (22) in their closed position, with the grippers (22) shown in phantom representing the open position.

Also as shown in FIG. 5, spacing means cooperating with the support members can be used to accurately position the support members, as pins (44a) can be used to facilitate spreading of the support members (30).

In the embodiment of FIG. 5, a spreading force (by means not shown) imparted to the outermost support members (30) causes the pins (44a) to catch at desired intervals and drag subsequent support members into position. The pins (44a) are preferably threadedly mounted in the support member (30) so that the desired interval between support members (30) can be adjusted.

With reference now to FIG. 6, another alternate embodiment of the invention will be described.

The tracks (38a) of the support members (30) may be positioned perpendicular to the grooves (28) of the base plate (24). Further, some or all of the grooves (28) of the base plate (24) may be located on additional support members (48) slidably mounted to the base plate (24) essentially perpendicular to the support members. The support members (30) and the additional support members (48) are slidably mounted to the base plate (24) so as to be spaceable perpendicularly to each other. The grippers (22) are mounted on the support members at the points of intersection of the grooves (28) with the tracks (38a) as described above. In this embodiment, however, the tracks (38a) of the support members (30) accommodate motion of the grippers (22) in the (Y) direction while the grooves (28) in the base plate (24) and in the additional support members (48) accommodate motion of the grippers (22) in the (X) direction.

In this alternate embodiment, two motive means, (52) and (53) are also preferably provided as schematically depicted in FIG. 6, with motive means (52) operating support members (48) and motive means (53) operating support members (30). These motive means can be of any type as are known in the art. As per the example in FIG. 7, the support members (30) are displaceable along the (X) direction through a series of scissor-levers (50) connected to the support members (30). Thus, the scissor-levers (50) can be extended and withdrawn in order to impart the desired spacing motion to the support members (30). Similarly, additional support members (48) are displaceable along the (y) direction.

Returning to FIG. 6, the additional support members (48) may be actuated by a piston and rod structure (52) to obtain the desired motion of the additional support members (48) in the (Y) direction. As previously stated, however, it should be noted that these motive means are given by way of example only, and that numerous other conventional motive means could suitably be substituted therefor.

Thus, as shown in FIG. 6, the embodiment shown therein provides movement in the (Y) direction of the outside rows only via additional support members (48). It should be understood, however, that any number of additional support members (48) could be present, and any or all of these could be actuated by the piston and rod structure (52). Hence, the embodiment of FIG. 6 shows an intermediate stage, with support members 30 in the open or spaced apart position and additional support members (48) in the closed or spaced together position.

Figure 8:
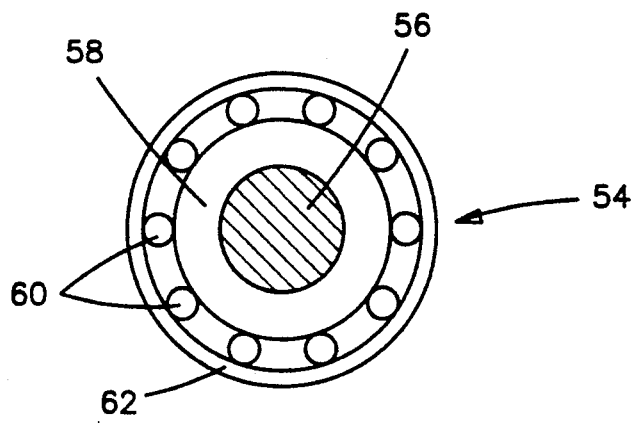
FIG. 8 is a cross section of an anti-rotation device according to the invention.

With reference now to FIG. 8, the slidable junction between the grippers (22), grooves (28) of the base plate (24), and tracks (38) or (38a) of the support members (30) are preferably established through anti-rotation mechanisms (54). The anti-rotation mechanisms (54) prevent rotation of the grippers (22) and their carried parisons (20) which would otherwise be imparted by the interaction of the grooves (28) and tracks (38) with the shaft (56) of the gripper (22). Such rotation is undesirable as it may adversely affect ultimate positioning of the parisons (20). FIG. 8 shows the shaft (56) of the gripper (22) mounted inside an inner sleeve (58). The inner sleeve (58) carries a plurality of bearing members or needles (60) which allow the free rotation of an outer sleeve (62). The outer sleeve (62) is the element of the device which is in contact with the grooves (28) and tracks (38). Thus, the shaft (56) and inner sleeve (58) may be fixed against rotation through any means known in the art, such as, for example, a connection to a slide means affixed to the support member (30), thereby preventing rotation of the article held by the gripper while permitting free rotation of outer sleeve (62). Such an anti-rotation mechanism (54) could be usefully employed in any of the aforedescribed embodiments.

As previously mentioned, the apparatus according to the present invention is preferably used for adjusting the center spacing in two directions between an injection molding workstation having a narrow center spacing of workpieces and a blow molding workstation having an increased center spacing between the workpieces. It should be noted, however, that the invention may be usefully disposed for operation between any workstations which require an alteration in two directions of the center spacing of the workpieces. Further, various other workstations could obviously be located between the apparatus according to the invention and any of the workstations requiring the modified center spacing.

In any of the aforedescribed applications, it is clear that the apparatus according to the invention provides two-directional repositioning of the center spacing of the workpieces, which results in greater operating efficiency and more efficient usage of space in a machine employing the device according to the invention.

It is to be understood that the invention is not limited to the illustrations described and shown herein, which are deemed to be merely illustrative of the best modes of carrying out the invention, and which are susceptible to modification of form, size, arrangement of parts and details of operation. The invention rather is intended to encompass all such modifications which are within its spirit and scope as defined by the claims.

What is claimed is:

1. An apparatus for increasing the center spacing between plastic parisons to enable expansion of said plastic parisons at a blow molding station, which comprises:

an upstream workstation for a plurality of parisons wherein said parisons are spaced from each other at a first center spacing;

a downstream workstation for said parisons wherein said parisons are spaced from each other at a second center spacing which differs from and which is larger than the first center spacing;

means for altering the center spacing of the parison in two directions from the first center spacing of the upstream workstation to the second center spacing of the downstream workstation, said means for altering the center spacing comprising a plate means, a plurality of support members movable on the plate means for movement in the X direction, with at least one longitudinal track extending through each of said support members in the Y direction perpendicular to the X direction, a plurality of grooves in the plate means disposed at an angle to the tracks, wherein the tracks intersect said grooves, and a plurality of grippers mounted on the support members carrying said parisons equal in number to a predetermined number of parisons to be processed per cycle, the grippers being slidably disposed on said support members at the points of intersection of the grooves in the plate means and the tracks;

spacing means cooperating with the support members to accurately position the support members; and an anti-rotation mechanism comprising a gripper shaft mounted inside an inner sleeve, said inner sleeve carrying a plurality of bearing members which in turn are mounted inside a freely rotatable sleeve, whereby, sliding movement of the support members is operative to move the grippers along the grooves and in the X and Y directions from the first center spacing to the second center spacing and displacement of the support members relative to the plate means results in two directional spreading of the grippers from the first center spacing to the second center spacing.

2. Apparatus according to claim 1, wherein the angle of intersection is predetermined to provide two directional spreading of the articles responsive to displacement of the support members.

3. An apparatus according to claim 1, wherein said grooves define angular paths of displacement from the first center spacing to the second center spacing.

* * * * *